United States Patent
Tanaka et al.

(10) Patent No.: US 8,266,958 B2
(45) Date of Patent: Sep. 18, 2012

(54) LIQUID LEVEL SENSOR DEVICE FOR LIQUEFIED GAS

(75) Inventors: Kazuhide Tanaka, Hitachi (JP); Masaya Takahashi, Hitachinaka (JP); Michiya Okada, Mito (JP); Hideki Abe, Tsukuba (JP); Motoharu Imai, Kashiwa (JP)

(73) Assignee: Hitachi, Ltd., Tokyo (JP)

( * ) Notice: Subject to any disclaimer, the term of this patent is extended or adjusted under 35 U.S.C. 154(b) by 1262 days.

(21) Appl. No.: 11/747,960

(22) Filed: May 14, 2007

(65) Prior Publication Data

US 2007/0266795 A1 Nov. 22, 2007

(30) Foreign Application Priority Data

May 15, 2006 (JP) ................. 2006-135799

(51) Int. Cl.
*G01F 23/24* (2006.01)
(52) U.S. Cl. ..................... 73/304 R
(58) Field of Classification Search .............. None
See application file for complete search history.

(56) References Cited

U.S. PATENT DOCUMENTS

| 3,943,767 | A | * | 3/1976 | Efferson | 73/295 |
| 7,841,235 | B2 | | 11/2010 | Haberstroh | |
| 2003/0036482 | A1 | * | 2/2003 | Thieme et al. | 505/100 |
| 2005/0074220 | A1 | * | 4/2005 | Rey | 385/141 |

FOREIGN PATENT DOCUMENTS

| GB | 1 096 025 | 12/1967 |
| JP | 2000275085 | 10/2000 |
| JP | 2002202175 | 7/2002 |
| JP | 2008-532022 | 8/2008 |
| WO | WO 2006/094489 A2 | 9/2006 |

OTHER PUBLICATIONS

Zentani, Yuji and Akimitsu, Jun. "Discovery of the New Superconductor MgB2 and its Recent Development". JSAP No. 6. Jul. 2002. pp. 4-11.*
Haberstroh, Ch. and Zick, C. "A Superconductive MGB2 Level Sensor for Liquid Hydrogen". Advances in Cryogenic Engineering: Transactions of the Cryogenic Engineering Conference—CEC, Presented Aug. 29-Sep. 2, 2005. Publsihed: AIP Conference Proceedings; 2006, vol. 823 Issue 1, p. 679-684.*
Saswato Das, The Sensible Superconductor, IEEE Spectrum, vol. 39, No. 7, XP002387954, Jul. 1, 2002, pp. 34-37.
JP Office Action of Appln. No. 2006-135799 dated Dec. 20, 2012.

* cited by examiner

*Primary Examiner* — Hezron E Williams
*Assistant Examiner* — Mark A Shabman
(74) *Attorney, Agent, or Firm* — Antonelli, Terry, Stout & Kraus, LLP.

(57) ABSTRACT

An object is to provide a liquid level sensor device for liquefied gas enabling measurement on a liquid level of liquefied gas having a boiling point in the vicinity of 21 K, e.g. liquid hydrogen, accurately and with good reproducibility and enabling simple production with good reproducibility. The present invention is a liquid level sensor device for liquefied gas including compound containing magnesium and boron arranged in succession in the longitudinal direction over the entire or a part of surface of a linear conductor made of metal and a portion of the compound thereof dipped in liquid is in a superconductive state at liquid level measurement.

13 Claims, 5 Drawing Sheets

LIQUID LEVEL SENSOR DEVICE FOR LIQUEFIED GAS

FIELD OF THE INVENTION

The present invention relates to a liquid level sensor device for liquefied which measures a liquid level of liquefied gas such as liquefied hydrogen.

BACKGROUND OF THE INVENTION

In the case of supplying and storing liquefied gas in a tank for storing liquefied gas, it is necessary to measure, monitor and control the amount of cold liquid. In order to measure liquid level of liquefied gas for that purpose, a mechanical, optical or electrical method is known as a method of measuring respective types of liquid level. However, a mechanical method, which enables detection of changes in the continuous liquid level, has disadvantages that accuracy is not good. In addition, the optical method and the electrical method with resistant elements result in noncontiguous detection to present a problem. Therefore, as the present time, any method is insufficient in performance from the view point of accuracy and detection mode as a sensor device for measuring a cold liquid level.

As a method for solving such a problem, a measuring method with superconductive sensor device beam is known as (see, for example, JP-A-2000-275085). Actually, the superconductive sensor device beam with a NbTi cord practically used as a liquid level sensor device for liquefied gas which measures liquid helium is electrically connected to a current lead for carrying current for measurement in the vicinity of the upper end and the lower end and a voltage lead for measuring voltage. In principle thereof, significant changes in electrical resistance in the normal conductive state at the time of the superconducting transition state of a superconductor is utilized to detect changes in electrical resistance between a liquid level sensor device end portions and to measure thereby height of liquid level since distribution of electrical resistance in a sensor device changes according to temperature distribution appearing between the portion dipped in liquid of a sensor device and the portion of the sensor device exposed on the upper side of liquid level. Such a feature does not need integrating a window portion for viewing a liquid level directly into an apparatus, and is less influenced by frost and the like.

As an important example of application of a liquid level sensor device for liquefied gas, there is a hydrogen station for fuel cells, development of which is progressing rapidly. A fuel cell generates electric power by chemical reaction between hydrogen and oxygen. Emission of the fuel cell is only water and the fuel cell is potential to become a power supply which is extremely friendliness to the global environment. Hydrogen being fuel for fuel cells exists little in the natural world and therefore is mainly produced artificially. Storage is required after production and is considered to be implemented with hydrogen in a liquid state as a representative example of method thereof. In this case, it is necessary to consistently monitor the liquid level of liquid hydrogen.

However, there are problems that when the temperature of liquid hydrogen becomes 20 K of the boiling temperature, it is difficult to use conventional NbTi cords and the high-temperature superconductive wire in the aspect of a critical temperature and accuracy. Therefore, it is desired to develop a liquid level sensor device for liquefied gas with superconductor the critical temperature of which is 21 K to 31 K and which is produced inexpensively. A sensor device with oxide superconductor such as Bi system oxide and the like with higher critical temperature is proposed as well (see JP-A-2002-202175). Production thereof, however, is not necessarily easy and costly burden is significant, resulting in a problem for building a stable sensing system.

BRIEF SUMMARY OF THE INVENTION

In addition, in the recent years, $MgB_2$ has been discovered to show superconductivity at 39 K. Thereafter development of rod with $MgB_2$ is globally underway. Major aspect of $MgB_2$ is that production thereof is more inexpensively and conveniently than the oxide system.

Using $MgB_2$ superconductive wire with $MgB_2$ filled in a metal tube, experimental production of hydrogen liquid level sensor device is currently underway. However, in this case, so-called powder-in-tube method is adopted to produce a wire rod. Therefore it is necessary to secure the inner diameter of the metal tube of about 3 mm at the time of being filled with powder. In the case of the tube having thickness of 0.5 mm, the diameter of the metal tube will become 4 mm. Assuming wire-drawing process to provide diameter of 4 mm to diameter of 0.2 mm, 50 to 80 rounds of process path are required, resulting in a significant problem in productivity of the sensor device portion. In addition, as the wire gets thinner, the risk of disconnection increases, resulting in, therefore, such a problem that the yield factor significantly decreases.

The present invention for application is attained in view of such circumstances and an object thereof is to provide a liquid level sensor device for liquefied gas enabling precise measurement of liquid level for liquefied gas such as liquid hydrogen having the boiling point at in the vicinity of 20 K by using a compound containing magnesium and boron, and is produced conveniently.

Other objects, features and advantages of the invention will become apparent from the following description of the embodiments of the invention taken in conjunction with the accompanying drawings.

DESCRIPTION OF REFERENCE NUMERALS 1 metal core
2 $MgB_2$ superconductive layer
3 metal core
4 $MgB_2$ superconductive layer
5 metal core
6 $MgB_2$ superconductive layer
7 liquid level sensor device for liquefied gas
8 direct current source
9 direct current voltmeter
10 current lead
11 voltage lead
12 liquefied gas
13 liquefied gas liquid level
14 temperature dependency of electricresistivity of a liquid level sensor device for liquefied gas with electric resistivity of a $MgB_2$ superconductive layer in a normal conductive state being equal to electric resistivity of the metal core
15 temperature dependency of electric resistivity of a liquid level sensor device for liquefied gas with electric resistivity of a $MgB_2$ superconductive layer in a normal conductive state being three time larger than electric resistivity of the metal core
16 temperature dependency of electric resistivity of a liquid level sensor device for liquefied gas with electric resistivity of a $MgB_2$ superconductive layer in a normal conductive state being 5 times to 100 times larger than electric resistivity of the metal core
17 liquid level sensor device for liquefied gas
18 direct current source
19 direct current voltmeter
20 current lead
21 voltage lead
22 liquefied gas
23 liquid level
24 metal core
25 $MgB_2$ superconductive layer
26 hydrogen supply source
27 fixed or mobile hydrogen station
28 fuel-cell installed vehicle

DETAILED DESCRIPTION OF THE INVENTION

In order to solve the above described problem, the first aspect of the present invention is that liquid level sensor device for liquefied gas contains a superconductive compound layer containing magnesium and boron which is arranged in succession in the longitudinal direction over the entire or a part of surface of a linear conductor made of metal, and a portion of the compound thereof dipped in liquid is in the superconductive state at the time of measuring liquid level.

The second aspect of the present invention is that the superconductive compound layer containing magnesium and boron is a binary compound thereof and Mg:B=X:Y showing molar ratio of Mg and B thereof falls within a range of X=1 and Y=1.2 to 1.9 or 2.1 to 2.8.

The third aspect of the present invention is that the superconductive compound layer containing magnesium and boron is a binary compound thereof and Mg:B=X:Y showing Mg to B molar ratio thereof falls within a range of Y=2 and X=0.4 to 0.9 or 1.1 to 1.8.

The fourth aspect of the present invention is that the diameter of a cylinder falls within a range of 0.04 mm to 0.2 mm in the case where the above described liquid level sensor device for liquefied gas is the cylinder.

The fifth aspect of the present invention is that electric resistivity of the superconductive compound layer containing magnesium and boron being arranged on the surface of a linear conductor in a normal conductive state falls within a range of 5 times to 100 times larger than electric resistivity of the linear conductor.

The sixth aspect of the present invention is that when the liquid level sensor device for liquefied gas which contains the superconductive compound layer containing magnesium and boron being arranged on the surface of a linear conductor has electric resistivity of $\rho$ (300 K) at the temperature of 300 K and electric resistivity of $\rho$ (40 K) at the temperature of 40 K, the value of $1-(\rho(40\text{ K})/\rho(300\text{ K}))$ is not more than 0.5.

The seventh aspect of the present invention is that the superconductive compound layer containing magnesium and boron contains at least one element selected from the group consisting of carbon and silicon.

The eighth aspect of the present invention is that the surface of the liquid level sensor device for liquefied gas is coated with resin.

The ninth aspect of the present invention is that metal and the superconductive compound layer containing magnesium and boron are stacked coaxially to form multilayered structure and the superconductive compound layers are mutually shorted at an end of the sensor device.

The tenth aspect of the present invention is to provide a liquid level sensor for liquefied gas wherein the above described sensor device is used and the eleventh aspect of the present invention is to provide a liquid level sensor for liquid hydrogen, which is operated at a hydrogen station for supplying a fuel-cell installed vehicle with hydrogen, having sensor devices provided to a line of leading hydrogen from a hydrogen source to a hydrogen station and provided to a supply line for supplying hydrogen from the hydrogen station to the fuel-cell installed vehicle.

The twelfth aspect of the present invention is that superconductive compound layer containing magnesium and boron is arranged on the surface of the linear conductor by an electroplating method to manufacture thereby a liquid level sensor device for liquefied gas.

According to the first aspect of the present invention, the liquid level sensor device for liquefied gas contains the compound of magnesium and boron arranged in succession in the longitudinal direction over the entire or a part of surface of a linear conductor made of metal to form a compound layer and a portion of the compound containing magnesium and boron dipped in liquid is in the superconductive state at the time of measuring liquid level. As a result, the liquid level sensor device for liquefied gas which has accuracy and high speed as a liquid level sensor device for liquefied gas having the boiling point in the vicinity of 20 K, for example liquid hydrogen, can be provided.

According to the second aspect of the present invention, the compound containing magnesium and boron is a binary compound of magnesium and Mg:B=X:Y showing molar ratio of Mg and B thereof falls within a range of X=1 and Y=1.2 to 1.9 or 2.1 to 2.8. As a result, since the superconducting transition temperature becomes 21 K to 31 K as in the case of the fifth aspect of the present invention, the sensor of the present invention can be preferably used as a liquid level sensor device for liquefied gas having the boiling point in the vicinity of 20 K, for example liquid hydrogen.

According to the third aspect of the present invention, the compound containing magnesium and boron is a binary compound of magnesium and Mg:B=X:Y showing molar ratio of Mg and B thereof falls within a range of Y=2 and X=0.4 to 0.9 or 1.1 to 1.8. As a result, since the superconducting transition temperature becomes 21 K to 31 K as in the case of the fifth aspect of the present invention or the sixth aspect of the present invention, the sensor of present invention can be preferably used as a liquid level sensor device for liquefied gas having the boiling point in the vicinity of 20 K, for example liquid hydrogen.

According to the fourth aspect of the present invention, the diameter of the liquid level sensor device for liquefied gas falls within a range of 0.04 mm to 0.2 mm, thereby enabling restraint of Joule heat occurred at the time of passing current. As a result, loss due to vaporization of liquefied gas decreases. In addition, heat capacity gets small, enabling response speed of the liquid level sensor device for liquefied gas to rise.

According to the fifth aspect of the present invention, electric resistivity of the compound containing magnesium and boron which is arranged on the surface of a linear conductor in a normal conductive state falls within a range of 5 times to 100 times larger than electric resistivity of the linear conductor and thereby temperature dependency of electric resistivity gets smaller, enabling therefore measurement of liquid level at high accuracy.

According to the sixth aspect of the present invention, when the liquid level sensor device for liquefied gas containing the compound containing magnesium and boron being arranged on the surface of a linear conductor has electric resistivity of $\rho$ (300 K) at the temperature of 300 K and electric resistivity of $\rho$ (40 K) at the temperature of 40 K, the value of $1-(\rho(40 K)/\rho(300 K))$ is not more than 0.5. As a result, temperature dependency of electric resistivity can be prevented, thereby measuring liquid level at high accuracy.

According to the seventh aspect of the present invention, the compound containing magnesium and boron contains at least one element selected from the group consisting of carbon and silicon. As a result, since a superconducting transition temperature becomes 21 K to 31 K, the sensor of the present invention preferably used as a liquid level sensor device for liquefied gas having the boiling point in the vicinity of 21 K, for example liquefied hydrogen.

According to the eighth aspect of the present invention, the surface of the liquid level sensor device for liquefied gas is coated with resin. As a result, since a liquid level sensor device for liquefied gas is enforced and protected against corrosion due to deposition of water, disconnection, deterioration in performance and the like hardly occur even due to long use.

According to the ninth aspect of the present invention, the superconductor layers are mutually shorted at an end, and thereby to simplify wire lead and to enable simplification of the setting and the like of the liquid level sensor device for liquefied gas.

According to the tenth aspect of the present invention and the eleventh aspect of the present invention, response speed and measurement accuracy are improved more significantly than conventional optical and electrical methods, enabling such as monitoring on flow amount of liquefied hydrogen by hydrogen lead line as well as hydrogen supply line with drastic variation of liquid level at a hydrogen station, for example, for supplying a fuel-cell installed vehicle with hydrogen.

According to the twelfth aspect of invention of the present application, superconductive compound layer containing magnesium and boron is arranged on the surface of a linear conductor by an electroplating method, enabling thereby forming a uniform layer into any shape by using a simple apparatus and technique.

The aspects of the present invention are as described above and embodiments thereof will be described below.

Figure 1:
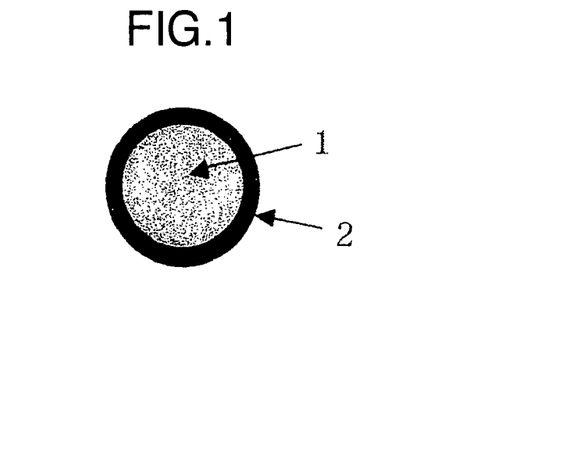
FIG. 1 is a section of an example of a liquid level sensor device for liquefied gas of the present invention for application.
Figure 2:
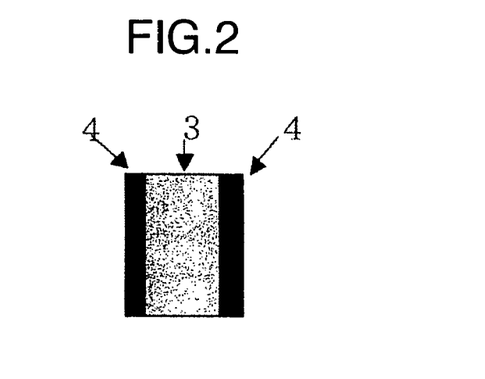
FIG. 2 is a section of an example of a liquid level sensor device for liquefied gas of the present invention for application.
Figure 3:
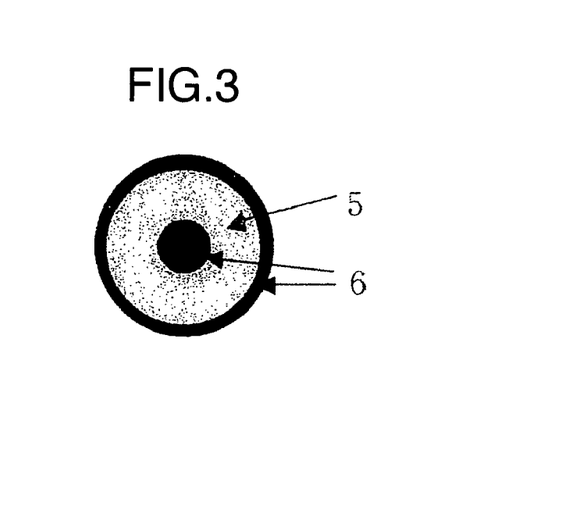
FIG. 3 is a section of an example of a liquid level sensor device for liquefied gas of the present invention for application.

Among others, the aspect of the liquid level sensor device for liquefied gas of the present invention contains the superconductive compound layers containing magnesium and boron (hereinafter to be abbreviated as $MgB_2$ superconductive compound layers) being arranged in succession in the longitudinal direction on the surface of a linear conductor made of metal and the like (hereinafter to be abbreviated as metal core). As for the shape of the liquid level sensor device for liquefied gas, a cylinder, a rectangular parallelpiped, a tape-like shape, polygons and the like can be used. The description "arranged in succession in the longitudinal direction" described in the present invention refers to arrangement without any discontinuation in the longitudinal direction in a constant mode for a linear conductor along the longitudinal direction of the linear conductor. An example of the liquid level sensor device for liquefied gas of the present invention will be illustrated in FIGS. 1 to 3. FIG. 1 is a sectional view of a liquid level sensor device for liquefied gas where a metal core 1 is cylindrically shaped and a $MgB_2$ superconductive layer 2 is uniformly arranged in the entire surface thereof. FIG. 2 is a sectional view of a liquid level sensor device for liquefied gas containing a metal core 3 in a rectangular solid shape with $MgB_2$ superconductive layers 4 arranged on two planes which are opposite to the longitudinal direction. The $MgB_2$ superconductive layer may be arranged in the entire surface of the metal core as in FIG. 1 or may be arranged in a portion of the surface as in FIG. 2, if they are arranged in succession in the longitudinal direction. FIG. 3 is a sectional view of a liquid level sensor device for liquefied gas containing a superconductive compound cylindrical core layer 6 containing magnesium and boron coated with a metal 5 in the circumference and containing a $MgB_2$ superconductive compound layer 6 formed on its surface. The $MgB_2$ superconductive layer and the metal can be brought to form multilayer structure. As the method of arranging the $MgB_2$ superconductive layer on the surface of the metal core or in its portion, the known methods such as an electroplating method and an evaporation method can be utilized. The case where a liquid level sensor device for liquefied gas is produced by an electroplating method is advantageous in that forming any shape is feasible. That is, a liquid level sensor device for liquefied gas fitting to the shape or the size of the interior of a storage tank can be provided.

The $MgB_2$ superconductive layer of the present invention is an $MgB_2$ superconductive layer as a binary compound layer containing magnesium and boron in the form of $Mg_XB_Y$ preferably prepared to give molar ratio X and Y as follows:

X=1 and Y=1.2 to 1.9 or 2.1 to 2.8 or

Y=2 and X=0.4 to 0.9 or 1.1 to 1.8.

According to this, the critical temperature can be adjusted to fall within a preferable range in order to measure the liquid level of liquefied hydrogen accurately. The preferable critical temperature falls within the range of 21 K to 31 K. The reason thereof is that clarity in the boundary between the portion presenting normal conductivity and the portion presenting superconductivity is suitable for accuracy in measuring the liquid level. In order to adjust the critical temperature to 21 K to 31 K, a third element can be added to the $MgB_2$ superconductive layer containing magnesium and boron. For example, by adding silicon and carbon, the critical temperature can be adjusted to a preferable range. Thereby, accurate measurement of liquid level becomes feasible with regard to liquefied gas such as hydrogen with boiling point in the vicinity of 21 K. In addition, without limiting the composing ratio as described above, the heat treating temperature, the heat treating time or the heat treating atmosphere in electroplating are adjusted and thereby enable the critical temperature of the $MgB_2$ superconductive layer to vary to fall within the range of 21 K to 31 K.

Figure 4:
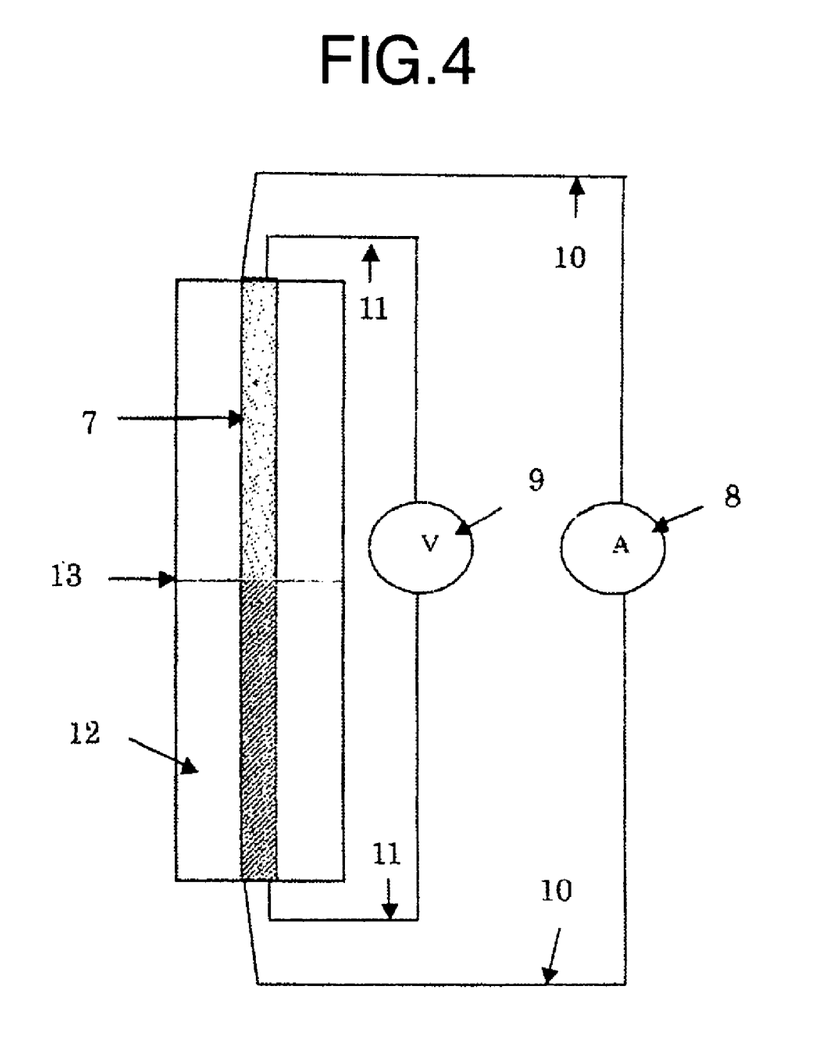
FIG. 4 is a schematic diagram of a liquid level measuring system in utilization of a liquid level sensor device for liquefied gas of the present invention for application.

FIG. 4 is a schematic diagram of an embodiment showing that a liquid level measuring system using the liquid level sensor device for liquefied gas of the present invention is applied to a liquefied hydrogen storage tank. The both ends of the liquid level sensor device for liquefied gas 7 are respectively connected to a direct current source 8 supplying current and to a voltmeter 9 measuring the generated voltage. The direct current source and the direct current voltmeter are each provided with two units of current lead lines 10 and voltage lead lines 11. Connection between the lead lines and the portion where the $MgB_2$ superconductive layer is arranged is normally implemented by depositing an Au electrode and the like. When the liquid level sensor device for liquefied gas is inserted in perpendicular to the liquid level of the liquefied gas inside the container, the portion of the $MgB_2$ superconductive compound layer lower than the liquid level will be in the superconductive state and the portion upper than the liquid level will be in the normal conductive state at the time of measuring the liquid level since temperature of the liquefied gas (liquid hydrogen) is not higher than 21 K and a superconducting transition temperature of the $MgB_2$ superconductive layer is around 21 K to 31 K. Here, in the present invention, the description "portion dipped in liquid" in the present invention refers to a portion being present in the portion lower than the liquid level of the liquid level sensor device for liquefied gas. When appropriate current flows from the direct current source 8, the portion of the $MgB_2$ superconductive compound layer on the sensor device surface upper than the liquid level is in the normal conductive state and therefore the major portion of current flows in the metal core in the low resistor portion. In contrast, the $MgB_2$ superconductive compound layer on the sensor device surface lower than the liquid level is in the superconductive state. Therefore, electric resistance becomes zero and almost all the current flows in the $MgB_2$ superconductive compound layer. At this time, the resistance value of the liquid level sensor device for liquefied gas 7 to be measured is only electric resistance of the metal core portion present higher than the liquid level. Therefore, the measurement of electric resistance enables measurement of the liquid level.

As one of the methods for increasing measurement accuracy of the liquid level sensor device for liquefied gas, there is a method of increasing output voltage by increasing flow current value of the liquid level sensor device for liquefied gas. However, increase in current flowing amount results in the increase of Joule heat for liquefied gas, non-efficiently leading to unnecessary evaporation of liquefied gas. In addition, the arranged $MgB_2$ superconductive compound layer occasionally burns out. Moreover, if large current is caused to flow in a liquid level sensor device for liquefied gas and then, due to dipping in liquefied gas, the portion in the superconductive state will come into a normal conductive state, giving rise to such a problem that precise measurement on liquid level will become no longer feasible. Moreover, Joule heat causes film boiling near the liquid surface to decrease the liquid level locally, thereby giving rise to such a problem that the liquid level is apt to be measured lower than actual liquid level.

Therefore, it is preferable to make heat capacity of the liquid level sensor device for liquefied gas small. Decrease in heat capacity is effective for the increase of the response speed of a sensor device as well. For this purpose, it is most effective to make cross-sectional area small. In order to secure sufficient measurement accuracy and response speed, in the case where the liquid level sensor device for liquefied gas is cylindrically shaped, the diameter preferably falls within the range of 0.04 mm to 0.2 mm.

Temperature dependency of electric resistivity in the normal conductive state is a factor related to measurement accuracy of a liquid level sensor device for liquefied gas. The liquid level measuring system using the liquid level sensor device for liquefied gas of the present invention is apt to give rise to an error in liquid level measurement as the temperature dependency of electric resistivity in the higher temperature region than the critical temperature increases. Most superconductors generally have large temperature dependency of electric resistivity at the temperature higher than the critical temperature, that is, the temperature in the environment in the normal conductive state. Also in the present invention for application, the $MgB_2$ superconductive compound layer in a normal conductive state is rather larger than the metal core in electric resistivity. Therefore, a small cross-sectional area of the $MgB_2$ superconductive compound layer to be arranged will restrain temperature dependency of electric resistivity of sensor device to consequently contribute to improvement in liquid level measurement accuracy.

In addition, due to the likewise reason, in the case where electric resistivity of the $MgB_2$ superconductive compound layer per unit length is higher than the metal core, the leak current to the $MgB_2$ superconductive compound layer is restrained, and reduces the influence of temperature dependency of electric resistivity of the $MgB_2$ superconductive compound layer. Therefore, this is suitable for measuring the liquid level precisely. The $MgB_2$ superconductive compound layer is preferably arranged so that electric resistivity of the $MgB_2$ superconductive compound layer becomes 5 times to 100 times larger than electric resistivity of the metal core. In other words, in the case where electric resistivity of the $MgB_2$ superconductive compound layer is 1, electric resistivity of the metal core is made to fall within the range of 0.01 to 0.2.

In addition, due to the likewise reason, it is preferable that electric resistivity in the normal conductive state does not vary on temperature at all, that is, rate of change gets closer to 1 without limit in order to improve measurement accuracy. In short, it is preferable that electric resistivity has property of changing little from the room temperature to the boiling point temperature of liquefied gas. Adoption of material with largely temperature-dependent electric resistivity for the metal core will no longer allow the measured resistance value to establish the linear relation with length of the sensor device being present above the liquid level. Therefore measurement errors occur in the measurement value of the liquid level. Material selected from the group consisting of HASTELLOY® superalloy, INCONEL® superalloy, stainless steel, iron, copper alloy, aluminum alloy and graphite, in particular, is suitably applied as material enabling a superconductive compound layer, which causes less temperature change of electric resistivity and contains magnesium and boron necessary for the liquid level sensor device for liquefied gas, to show superconductive property.

The liquid level sensor device for liquefied gas of the present invention is an extremely thin wire and therefore is apt to cause disconnection at the time of attachment and detachment. In order to prevent disconnection, the liquid level sensor device for liquefied gas can be protected by using a method of embedding it into resin, coating the surface of the liquid level sensor device for liquefied gas with resin, or the like. The known resin such as epoxy type resin can be used. In the case of the method of embedding the liquid level sensor device for liquefied gas into resign, it is possible to adopt the known method, e.g. the method of inserting liquid level sensor device for liquefied gas into resin dissolved in a solvent, decompressing it to remove the solvent, and solidifying the resin. As a result, in addition to disconnection of the sensor device, the performance deterioration due to reaction between the $MgB_2$ superconductive compound layer on the sensor device surface and water and the performance deterioration due to thermal stress, the distortion and the like can be restrained to enable the improvement of the life of the sensor device.

For the purpose of operability such as maintenance of the liquid level sensor device for liquefied gas, it is preferable that the liquid level sensor device for liquefied gas of the present invention includes the $MgB_2$ superconductive compound layer and the metal of the metal core being stacked coaxially to form multilayer structure and the mutual layers of the superconductive compound layer providing short in the lower end. As a method of forming short in the lower end, a method of masking the portion which does not form $MgB_2$ superconductive compound layer in the case of producing a sensor device wire lead is generally adopted. However, any method will be preferable if either side of the mutual superconductive compound layers in the multi-layer structure provides short in terms of electric circuit.

Next, examples of liquid level sensor device for liquefied gas of the present invention for application will be described. Of course, the present invention for application will not be limited to the following examples.

EXAMPLES

Example 1

Figure 5:
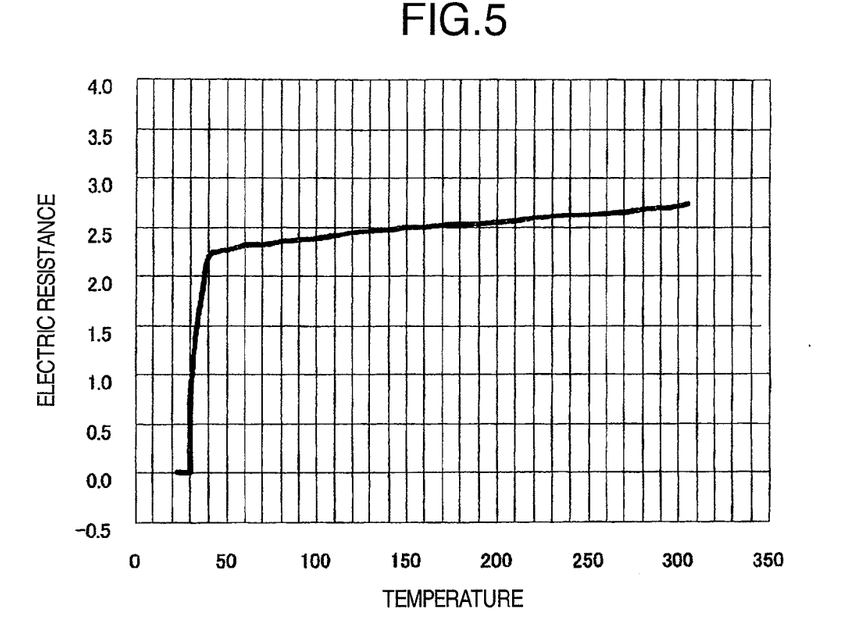
FIG. 5 is a diagram depicting changes in electric resistance value for changes in temperature of a liquid level sensor device for liquefied gas of the present invention for application.

An electroplating method was adopted to produce a liquid level sensor device for liquefied gas. Mixed salt containing magnesium chloride, sodium chloride, potassium chloride and magnesium borate in each molar ratio of 10:5:5:0.1 was prepared. The mixed salt was heated in the inactive gas (Ar) atmosphere at 600° C. to make molten salt. Iron wire with a diameter of around 0.1 mm and a graphite stick with a diameter of around 1 mm were inserted into the molten salt that was kept homogeneous by stirring. The iron wire and the graphite stick were brought into connection to the cathode and the anode of a direct current power supply respectively. Direct current voltage of 3.5 V to 4 V was applied between the both electrodes and was kept for 10 minutes. Thereby the iron wire surface dipped in the molten salt was covered by coating sheet with film thickness of around 0.01 mm including $MgB_2$. The iron wire was taken out from the molten salt, cooled to reach the room temperature and washed with methanol. The cross-section of the obtained sensor device wire was observed with an optical microscope to find that thin film of $MgB_2$ was formed on the entire surface of the metal core. The wire diameter of the metal core and $MgB_2$ film in total was estimated to be 0.11 mm. In this case, the wire diameter of the metal core was about 0.09 mm. FIG. 5 illustrates temperature dependency of electric resistance of the produced liquid level sensor device for liquefied gas. Electric resistance of the produced liquid level sensor device for liquefied gas was 2.7Ω at the temperature of 300 K and 2.2Ω at the temperature of 40 K. The ratio of change in electric resistance between the temperatures 300 K and 40 K was calculated to be $1-(2.2 \times 10^{-3}/2.7 \times 10^{-3})=0.186$. The liquid level sensor device for liquefied gas was confirmed to be little temperature-dependent of electrical resistance in the normal conductive state and show good electric resistive property. While 1 mA currency is being swept from the both ends of the sensor device under the condition of zero magnetic field, electric resistance was measured. The temperature of transition to superconductivity was 29.9 K.

Example 2

Except that an INCONEL® superalloy wire with a wire diameter of 0.09 mm to 0.10 mm was used as a metal core to adjust film thickness of the $MgB_2$ superconductive layer to reach 0.13 mm, the electroplating method likewise Example 1 was adopted to produce the liquid level sensor device for liquefied gas. In order to attain knowledge on optimum current for measuring the liquid level on the produced liquid level sensor device for liquefied gas, the relation between current and electric resistance was examined as current was being changed with constant length of the liquid level sensor device for liquefied gas in the gas. Increase in thickness of the $MgB_2$ superconductive layer will decrease resistance value of the non-superconductive portion. In order to measure the liquid level accurately, it is suitable to increase current to be supplied to the sensor device so as to correspond to the decreased amount of resistance. For the sample of the present example, without burning out the sensor device, the optimum current value was attained to thereby enable measurement of the liquid level.

Example 3

Except that film thickness of the $MgB_2$ superconductive layer was adjusted to attain a wire diameter of 0.20 mm, an operation likewise Example 2 was implemented. Also for the sample of the present example, without burning out the sensor device, the optimum current value was attained to thereby enable measurement of the liquid level.

Comparative Example 1

Except that film thickness of the $MgB_2$ superconductive layer was adjusted to attain a wire diameter of 0.31 mm, an operation likewise Example 2 was implemented. For the sample of the present comparative example, necessity of causing excess current to flow in the stage of attaining the optimum current occurred, giving rise to such a problem that the wire member was burnt out. The reason thereof is inferred to be Joule heat due to supply current and resistance of the sensor device wire lead. Consequently, the wire diameter of 0.31 mm can be thought not to allow use as the liquid level sensor device for liquefied gas.

Comparative Example 2

Except that film thickness of the $MgB_2$ superconductive layer was adjusted to attain a wire diameter of 0.53 mm, an operation likewise Example 2 was implemented. For the sample of the present comparative example, necessity of causing excess current to flow in the stage of attaining the optimum current occurred, giving rise to such a problem that the wire rod was burnt out. The reason thereof is inferred to be Joule heat due to supply current and resistance of the sensor device wire lead. Consequently, the wire diameter of 0.53 mm can be thought not to allow use as the liquid level sensor device for liquefied gas.

The results of Examples 2 and 3 and Comparative Examples 1 and 2 were compiled in Table 1.

TABLE 1

|  |  | EXAMPLE 2 | EXAMPLE 3 | COMPARATIVE EXAMPLE 1 | COMPARATIVE EXAMPLE 2 |
|---|---|---|---|---|---|
| METAL CORE | MATERIAL | INCONEL WIRE | INCONEL WIRE | INCONEL WIRE | INCONEL WIRE |
|  | WIRE DIAMETER mm | 0.09~0.10 | 0.09~0.10 | 0.09~0.10 | 0.09~0.10 |
| Mg—B COMPOUND ARRANGED ON SURFACE OF METAL CORE | COMPOSITION (Mg:B MOLAR RATIO) | 1:2 | 1:2 | 1:2 | 1:2 |
| MANUFACTURED LIQUEFIED GAS LIQUID LEVEL SENSOR | WIRE DIAMETER mm | 0.13 | 0.20 | 0.31 | 0.53 |
| PROPERTY OF LIQUEFIED GAS LIQUID LEVEL SENSOR | $1 - \rho(40\,K)/\rho(300\,K)$ | 0.07 | 0.07 | 0.07 | 0.07 |
|  | LIQUEFIED GAS LIQUID LEVEL MEASUREMENT | FEASIBLE | FEASIBLE | NOT FEASIBLE (BURNT SENSOR) | NOT FEASIBLE (BURNT SENSOR) |

Example 4

The INCONEL® superalloy wire with a wire diameter of 0.10 mm was used and electroplating condition was adjusted to attain film thickness of the MgB$_2$ superconductive layer to reach 0.03 mm. Otherwise, under the condition likewise Example 1, the liquid level sensor device for liquefied gas was produced. Response speed of the produced liquid level sensor device for liquefied gas was assessed as described below. Putting the liquid level sensor device for liquefied gas into a glass dewar filled with liquid hydrogen, measurement with a sensor device and measurement by visual observation were carried out simultaneously. In order to attain knowledge on accurate liquid level, a slit was provided in the glass dewar so that the reference height was set by visual observation from there. Accuracy of visual observation was set to approximately 0.5 mm. As for the liquid level sensor device for liquefied gas in the present example, time delay was not longer than 10 seconds to reach the measurement value corresponding to the reference liquid level.

Example 5

The INCONEL® superalloy wire with a wire diameter of 0.14 mm was used and electroplating condition was adjusted to attain film thickness of the MgB$_2$ superconductive layer to reach 0.03 mm. Otherwise, under the condition likewise Example 1, the liquid level sensor device for liquefied gas was produced. Response speed of the produced liquid level sensor device for liquefied gas was assessed likewise Example 4. As for the liquid level sensor device for liquefied gas in the present example, time delay was not longer than 10 seconds to reach the measurement value corresponding to the reference liquid level.

Example 6

The INCONEL® superalloy wire with a wire diameter of 0.31 mm was used and electroplating condition was adjusted to attain film thickness of the MgB$_2$ superconductive layer to reach 0.03 mm. Otherwise, under the condition likewise Example 1, the liquid level sensor device for liquefied gas was produced. Response speed of the produced liquid level sensor device for liquefied gas was assessed likewise Example 4. As for the liquid level sensor device for liquefied gas of the present example, time delay was 16 seconds to reach the measurement value corresponding to the reference liquid level.

Example 7

The INCONEL® superalloy wire with a wire diameter of 0.60 mm was used and electroplating condition was adjusted to attain film thickness of the MgB$_2$ superconductive layer to reach 0.03 mm. Otherwise, under the condition likewise Example 1, the liquid level sensor device for liquefied gas was produced. Response speed of the produced liquid level sensor device for liquefied gas was assessed likewise Example 4. As for the liquid level sensor device for liquefied gas of the present comparative example, time delay was 22 seconds to reach the measurement value corresponding to the reference liquid level.

The results of Examples 4 and 5 and Comparative Example 3 were compiled in Table 2.

TABLE 2

|  |  | EXAMPLE 4 | EXAMPLE 5 | EXAMPLE 6 | EXAMPLE 7 |
|---|---|---|---|---|---|
| METAL CORE | MATERIAL | INCONEL WIRE | INCONEL WIRE | INCONEL WIRE | INCONEL WIRE |
|  | WIRE DIAMETER mm | 0.10 | 0.14 | 0.31 | 0.60 |
| Mg—B COMPOUND ARRANGED ON SURFACE OF METAL CORE | COMPOSITION (Mg:B) | 1:2 | 1:2 | 1:2 | 1:2 |
| MANUFACTURED LIQUEFIED GAS LIQUID LEVEL SENSOR | WIRE DIAMETER mm | 0.16 | 0.20 | 0.37 | 0.66 |
| PROPERTY OF LIQUEFIED GAS LIQUID LEVEL SENSOR | LIQUEFIED GAS LIQUID LEVEL MEASUREMENT | FEASIBLE | FEASIBLE | FEASIBLE | FEASIBLE |
|  | RESPONSE SPEED | <10 SECONDS | <10 SECONDS | <16 SECONDS | <22 SECONDS |

As described above, based on Examples 2 to 7 and Comparative examples 1 and 2, it has been turned out that more effective liquid level sensor device for liquefied gas can be produced by setting the wire diameter of the entire sensor device to not more than 0.2 mm regardless of wire rod configuration such as diameter of metal core and thickness of sensor device.

Example 8

Figure 6:
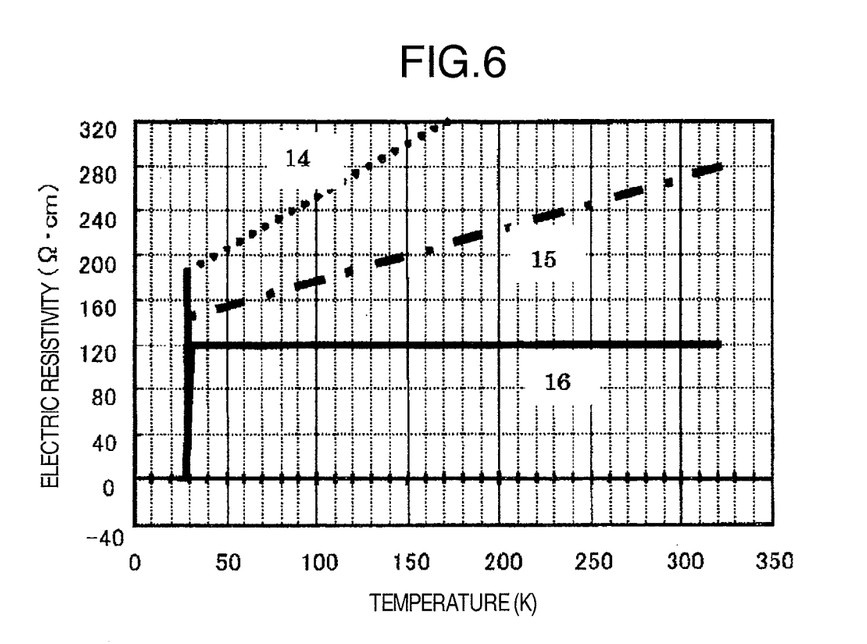
FIG. 6 is a diagram depicting temperature dependency of electric resistance of a liquid level sensor device for liquefied gas of Examples 8 to 12.

Except that HASTELLOY® superalloy with a wire diameter of 0.10 mm was used as a metal core to adjust the electroplating condition to make electric resistivity of $MgB_2$ superconductive layer arranged on the metal core surface 5 times larger than electric resistivity of the metal core, the electroplating method was adopted likewise example 1 to produce the liquid level sensor device for liquefied gas. Here, electric resistivity of HASTELLOY® superalloy wire is approximately 121 μΩ·cm at the temperature of 300 K and approximately 120 μΩ·cm at the temperature of 40 K. A line 16 in FIG. 6 shows temperature dependency of electric resistivity of the liquid level sensor device for liquefied gas produced in the present example. Temperature dependency of electric resistivity in the normal conductive portion got small to retain almost complete linear relation between length and resistance value on the liquid level of the sensor device, enabling measurement of the liquid level at extremely high accuracy.

Example 9

Except that the electroplating condition was adjusted to make electric resistivity of $MgB_2$ superconductive layer arranged on the metal core surface 10 times larger than electric resistivity of the metal core, the electroplating method was adopted likewise Example 6 to produce the liquid level sensor device for liquefied gas. Temperature dependency of electric resistivity of the liquid level sensor device for liquefied gas produced in the present example corresponded with the line 16 in FIG. 6.

Example 10

Except that the electroplating condition was adjusted to make electric resistivity of $MgB_2$ superconductive layer arranged on the metal core surface 100 times larger than electric resistivity of the metal core, the electroplating method was adopted likewise Example 6 to produce the liquid level sensor device for liquefied gas. Temperature dependency of electric resistivity of the liquid level sensor device for liquefied gas produced in the present example corresponded with the line 16 in FIG. 6.

Example 11

Except that the electroplating condition was adjusted to make electric resistivity of $MgB_2$ superconductive layer arranged on the metal core surface equal to electric resistivity of the metal core, the electroplating method was adopted likewise example 6 to produce the liquid level sensor device for liquefied gas. Temperature dependency of electric resistivity of the liquid level sensor device for liquefied gas produced in the present example is depicted by a line 14 in FIG. 6. The reason thereof is that current not only flew to the metal core at the time of normal conductive state but also was shunted to the $MgB_2$ superconductive layer, resulting in liquid level measurement with less accuracy despite feasibility of liquid level measurement with a high temperature dependence of electrical resistance.

Example 12

Except that the electroplating condition was adjusted to make electric resistivity of $MgB_2$ superconductive layer arranged on the metal core surface 3 times larger than electric resistivity of the metal core, the electroplating method was adopted likewise Example 6 to produce the liquid level sensor device for liquefied gas. Temperature dependency of electric resistivity of the liquid level sensor device for liquefied gas produced in the present example is depicted by a line 15 in FIG. 6. The reason thereof is that current not only flew to the metal core at the time of normal conductive state but also was shunted to the $MgB_2$ superconductive layer, resulting in liquid level measurement with less accuracy despite feasibility of liquid level measurement with a high temperature dependence of electrical resistance.

The results of Examples 8 to 12 were compiled in Table 3.

TABLE 3

|  |  | EXAMPLE 8 | EXAMPLE 9 | EXAMPLE 10 | EXAMPLE 11 | EXAMPLE 12 |
| --- | --- | --- | --- | --- | --- | --- |
| METAL CORE | MATERIAL | HASTELLOY WIRE | HASTELLOY WIRE | HASTELLOY WIRE | HASTELLOY WIRE | HASTELLOY WIRE |
|  | WIRE DIAMETER mm | 0.10 | 0.10 | 0.10 | 0.10 | 0.10 |
| Mg—B COMPOUND ARRANGED ON SURFACE OF METAL CORE | COMPOSITION (Mg:B) | 1:2 | 1:2 | 1:2 | 1:2 | 1:2 |
| MANUFACTURED LIQUEFIED GAS LIQUID LEVEL SENSOR | ELECTRIC RESISTIVITY (BEING 1 FOR METAL CORE) | 5 | 10 | 100 | 1 | 3 |
| PROPERTY OF LIQUEFIED GAS LIQUID LEVEL SENSOR | LIQUEFIED GAS LIQUID LEVEL MEASUREMENT | FEASIBLE | FEASIBLE | FEASIBLE | FEASIBLE | FEASIBLE |
|  | TEMPERATURE DEPENDENCY OF ELECTRIC RESISTIVITY | LINE 16 IN FIG. 6 | LINE 16 IN FIG. 6 | LINE 16 IN FIG. 6 | LINE 14 IN FIG. 6 | LINE 15 IN FIG. 6 |

Temperature dependency of electric resistivity was turned out to decrease to enable more highly accurate liquid level measurement by making electric resistivity of $MgB_2$ superconductive layer arranged on the metal core 5 times or more larger than electric resistivity of the metal core.

Example 13

The INCONEL® superalloy I wire with a wire diameter of 0.10 mm to 0.12 mm was used as the metal core and electroplating condition was adjusted to attain film thickness of the $MgB_2$ superconductive layer to reach approximately 0.05 mm. Otherwise, under the condition likewise Example 1, an electroplating method was adopted to produce a liquid level sensor device for liquefied gas. As a result of measurement on electric resistivity, electric resistivity was 140 Ω·cm at the temperature of 300 K and electric resistivity was 130 Ω·cm at the temperature of 40 K. So, those values underwent calculation to derive 1−(ρ(40K)/ρ(300K))=0.07. Putting the produced sensor device into a glass dewar filled with liquefied hydrogen and bringing the measurement value of liquid level with eyes and the measurement value of a sensor device in 10 seconds into comparison, the error of the measurement value of the sensor device from the actually measured liquid level was not more than 3%.

Example 14

Except that HASTELLOY® superalloy wire with a wire diameter of 0.10 mm to 0.12 mm was used as a metal core, the electroplating method was adopted under the conditions likewise Example 13 to produce the liquid level sensor device for liquefied gas and to implement likewise assessment. As a result of measurement on electric resistivity, electric resistivity was 121 Ω·cm at the temperature of 300 K and electric resistivity was 120 Ω·cm at the temperature of 40 K. So, those values underwent calculation to derive 1−(ρ(40K)/ρ(300K))= 0.01. The error from the actually measured liquid level was not more than 3%.

Example 15

Except that SUS304 wire with a wire diameter of 0.10 mm to 0.12 mm was used as a metal core, the electroplating method was adopted under the conditions likewise Example 13 to produce the liquid level sensor device for liquefied gas and to implement likewise assessment. As a result of measurement on electric resistivity, electric resistivity was 72 Ω·cm at the temperature of 300 K and electric resistivity was 50 Ω·cm at the temperature of 40 K. So, those values underwent calculation to derive 1−(ρ(40K)/ρ(300K))=0.31. The error from the actually measured liquid level was not more than 3%.

Example 16

Except that SUS310 wire with a wire diameter of 0.10 mm to 0.12 mm was used as a metal core, the electroplating method was adopted under the conditions likewise Example 13 to produce the liquid level sensor device for liquefied gas and to implement likewise assessment. As a result of measurement on electric resistivity, electric resistivity was 90 Ω·cm at the temperature of 300 K and electric resistivity was 70 Ω·cm at the temperature of 40 K. So, those values underwent calculation to derive 1−(ρ(40K)/ρ(300K))=0.22. The error from the actually measured liquid level was not more than 3%.

Example 17

Except that copper wire with a wire diameter of 0.10 mm to 0.12 mm was used as a metal core, the electroplating method was adopted under the conditions likewise Example 13 to produce the liquid level sensor device for liquefied gas and to implement likewise assessment. As a result of measurement on electric resistivity, electric resistivity was 1.7 Ω·cm at the temperature of 300 K and electric resistivity was 0.03 Ω·cm at the temperature of 40 K. So, those values underwent calculation to derive 1−(ρ(40K)/ρ(300K))=0.57. The error from the actually measured liquid level was 24%.

Example 18

Except that silver wire with a wire diameter of 0.10 mm to 0.12 mm was used as a metal core, the electroplating method was adopted under the conditions likewise Example 13 to produce the liquid level sensor device for liquefied gas and to implement likewise assessment. As a result of measurement on electric resistivity, electric resistivity was 1.6 Ω·cm at the temperature of 300 K and electric resistivity was 0.05 Ω·cm at the temperature of 40 K. So, those values underwent calculation to derive 1−(ρ(40K)/ρ(300K))=0.68. The error from the actually measured liquid level was 29%.

Example 19

Except that platinum wire with a wire diameter of 0.10 mm to 0.12 mm was used as a metal core, the electroplating method was adopted under the conditions likewise Example 13 to produce the liquid level sensor device for liquefied gas and to implement likewise assessment. As a result of measurement on electric resistivity, electric resistivity was 11 Ω·cm at the temperature of 300 K and electric resistivity was 1.7 Ω·cm at the temperature of 40 K. So, those values underwent calculation to derive 1−(ρ(40K)/ρ(300K))=0.85. The error from the actually measured liquid level was 35%.

The results of Example 13 to Example 19 were compiled in Table 4.

TABLE 4

| | | EXAMPLE 13 | EXAMPLE 14 | EXAMPLE 15 | EXAMPLE 16 | EXAMPLE 17 | EXAMPLE 18 | EXAMPLE 19 |
|---|---|---|---|---|---|---|---|---|
| METAL CORE | MATERIAL | INCONEL WIRE | HASTELLOY WIRE | SUS304 WIRE | SUS310 WIRE | COPPER WIRE | SILVER WIRE | PLATINUM WIRE |
| | WIRE DIAMETER mm | 0.10~0.12 | 0.10~0.12 | 0.10~0.12 | 0.10~0.12 | 0.10~0.12 | 0.10~0.12 | 0.10~0.12 |
| Mg—B COMPOUND ARRANGED ON SURFACE OF METAL CORE | COMPOSITION (Mg:B) | 1:2 | 1:2 | 1:2 | 1:2 | 1:2 | 1:2 | 1:2 |
| | FILM THICKNESS mm | 0.05 | 0.05 | 0.05 | 0.05 | 0.05 | 0.05 | 0.05 |
| PROPERTY OF LIQUEFIED GAS LIQUID LEVEL SENSOR | LIQUEFIED GAS LIQUID LEVEL MEASUREMENT | FEASIBLE | FEASIBLE | FEASIBLE | FEASIBLE | FEASIBLE | FEASIBLE | FEASIBLE |
| | ρ (300 K) | 140 | 121 | 72 | 90 | 1.7 | 1.6 | 11 |
| | ρ (40 K) | 130 | 120 | 50 | 70 | 0.03 | 0.05 | <2 |
| | 1 − ρ (40 K)/ρ (300 K) | 0.07 | 0.01 | 0.31 | 0.22 | 0.57 | 0.68 | 0.85 |
| | LIQUID LEVEL MEASUREMENT ERROR | <3 | <3 | <3 | <3 | 24 | 29 | 35 |

It has been found that the measured resistance value can retain the linear relation with length of the sensor device of the gas portion located above the liquid level so as to enable further highly accurate liquid level measurement with allowable range of measurement error on the liquid level being not more than 15% of visually measured value when the value of $1-(\rho(40K)/\rho(300K))$ is not more than 0.5 with regard to temperature dependency of electric resistivity of the sensor device. On the other hand, due to significant temperature dependency of electric resistance of metal cores themselves, use of a metal core selected from the group consisting of stainless, copper wire, silver wire and platinum wire did not establish any linear relation between resistance value and length of the sensor device above the liquid level, giving rise to low measurement accuracy on liquid level measurement.

Example 20

A binary compound containing magnesium and boron in the form of $Mg_XB_Y$ was prepared to give molar ratio X:Y of 1:1.2 by controlling the blending contents of magnesium chloride, sodium chloride, potassium chloride and magnesium borate at the time of producing a liquid level sensor device for liquefied gas by the electroplating method. Thereby likewise Example 1, a liquid level sensor device for liquefied gas was produced. The superconductive critical temperature of the obtained compound $Mg_XB_Y$ was 21 K. The measurement error on the obtained liquid level sensor device for liquefied gas was obtained likewise Example 13 to find that the error in measurement with the sensor device was 8% of the visually measured value.

Example 21

A binary compound containing magnesium and boron in the form of $Mg_XB_Y$ was prepared to give molar ratio X:Y of 1:1.5 by controlling the blending contents of magnesium chloride, sodium chloride, potassium chloride and magnesium borate at the time of producing a liquid level sensor device for liquefied gas by the electroplating method. Thereby likewise Example 1, a liquid level sensor device for liquefied gas was produced. The superconductive critical temperature of the obtained compound $Mg_XB_Y$ was 25 K. The measurement error on the obtained liquid level sensor device for liquefied gas was obtained likewise Example 13 to find that the error in measurement with the sensor device was 10% of the visually measured value.

Example 22

A binary compound containing magnesium and boron in the form of $Mg_XB_Y$ was prepared to give molar ratio X:Y of 1:1.7 by controlling the blending contents of magnesium chloride, sodium chloride, potassium chloride and magnesium borate at the time of producing a liquid level sensor device for liquefied gas by the electroplating method. Thereby likewise Example 1, a liquid level sensor device for liquefied gas was produced. The superconductive critical temperature of the obtained compound $Mg_XB_Y$ was 28 K. The measurement error on the obtained liquid level sensor device for liquefied gas was obtained likewise Example 13 to find that the error in measurement with the sensor device was 11% of the visually measured value.

Example 23

A binary compound containing magnesium and boron in the form of $Mg_XB_Y$ was prepared to give molar ratio X:Y of 1:1.9 by controlling the blending contents of magnesium chloride, sodium chloride, potassium chloride and magnesium borate at the time of producing a liquid level sensor device for liquefied gas by the electroplating method. Thereby likewise Example 1, a liquid level sensor device for liquefied gas was produced. The superconductive critical temperature of the obtained compound $Mg_XB_Y$ was 30 K. The measurement error on the obtained liquid level sensor device for liquefied gas was obtained likewise Example 13 to find that the error in measurement with the sensor device was 14% of the visually measured value.

Example 24

A binary compound containing magnesium and boron in the form of $Mg_XB_Y$ was prepared to give molar ratio X:Y of 1:2.0 by controlling the blending contents of magnesium chloride, sodium chloride, potassium chloride and magnesium borate at the time of producing a liquid level sensor device for liquefied gas by the electroplating method. Thereby likewise Example 1, a liquid level sensor device for liquefied gas was produced. The superconductive critical temperature of the obtained compound $Mg_XB_Y$ was 38 K. The measurement error on the obtained liquid level sensor device for liquefied gas was obtained likewise Example 13 to find that the error in measurement with the sensor device was 30% of the visually measured value.

Example 25

A binary compound containing magnesium and boron in the form of $Mg_XB_Y$ was prepared to give molar ratio X:Y of 1:2.1 by controlling the blending contents of magnesium chloride, sodium chloride, potassium chloride and magnesium borate at the time of producing a liquid level sensor device for liquefied gas by the electroplating method. Thereby likewise Example 1, a liquid level sensor device for liquefied gas was produced. The superconductive critical temperature of the obtained compound $Mg_XB_Y$ was 31 K. The measurement error on the obtained liquid level sensor device for liquefied gas was obtained likewise Example 13 to find that the error in measurement with the sensor device was 12% of the visually measured value.

Example 26

A binary compound containing magnesium and boron in the form of $Mg_XB_Y$ was prepared to give molar ratio X:Y of 1:2.5 by controlling the blending contents of magnesium chloride, sodium chloride, potassium chloride and magnesium borate at the time of producing a liquid level sensor device for liquefied gas by the electroplating method. Thereby likewise Example 1, a liquid level sensor device for liquefied gas was produced. The superconductive critical temperature of the obtained compound $Mg_XB_Y$ was 26 K. The measurement error on the obtained liquid level sensor device for liquefied gas was obtained likewise Example 13 to find that the error in measurement with the sensor device was 11% of the visually measured value.

Example 27

A binary compound containing magnesium and boron in the form of $Mg_XB_Y$ was prepared to give molar ratio X:Y of 1:2.8 by controlling the blending contents of magnesium chloride, sodium chloride, potassium chloride and magnesium borate at the time of producing a liquid level sensor device for liquefied gas by the electroplating method. Thereby likewise Example 1, a liquid level sensor device for liquefied gas was produced. The superconductive critical temperature of the obtained compound $Mg_XB_Y$ was 21 K. The measurement error on the obtained liquid level sensor device for liquefied gas was obtained likewise Example 13 to find that the error in measurement with the sensor device was 7% of the visually measured value.

Example 28

A binary compound containing magnesium and boron in the form of $Mg_XB_Y$ was prepared to give molar ratio X:Y of 0.4:2 by controlling the blending contents of magnesium chloride, sodium chloride, potassium chloride and magnesium borate at the time of producing a liquid level sensor device for liquefied gas by the electroplating method. Thereby likewise Example 1, a liquid level sensor device for liquefied gas was produced. The superconductive critical temperature of the obtained compound $Mg_XB_Y$ was 21 K. The measurement error on the obtained liquid level sensor device for liquefied gas was obtained likewise Example 13 to find that the error in measurement with the sensor device was 5% of the visually measured value.

Example 29

A binary compound containing magnesium and boron in the form of $Mg_XB_Y$ was prepared to give molar ratio X:Y of 0.7:2 by controlling the blending contents of magnesium chloride, sodium chloride, potassium chloride and magnesium borate at the time of producing a liquid level sensor device for liquefied gas by the electroplating method. Thereby likewise Example 1, a liquid level sensor device for liquefied gas was produced. The superconductive critical temperature of the obtained compound $Mg_XB_Y$ was 27 K. The measurement error on the obtained liquid level sensor device for liquefied gas was obtained likewise Example 13 to find that the error in measurement with the sensor device was 10% of the visually measured value.

Example 30

A binary compound containing magnesium and boron in the form of $Mg_XB_Y$ was prepared to give molar ratio X:Y of 0.9:2 by controlling the blending contents of magnesium chloride, sodium chloride, potassium chloride and magnesium borate at the time of producing a liquid level sensor device for liquefied gas by the electroplating method. Thereby likewise Example 1, a liquid level sensor device for liquefied gas was produced. The superconductive critical temperature of the obtained compound $Mg_XB_Y$ was 31 K. The measurement error on the obtained liquid level sensor device for liquefied gas was obtained likewise Example 13 to find that the error in measurement with the sensor device was 12% of the visually measured value.

Example 31

A binary compound containing magnesium and boron in the form of $Mg_XB_Y$ was prepared to give molar ratio X:Y of 1.1:2 by controlling the blending contents of magnesium chloride, sodium chloride, potassium chloride and magnesium borate at the time of producing a liquid level sensor device for liquefied gas by the electroplating method. Thereby likewise Example 1, a liquid level sensor device for liquefied gas was produced. The superconductive critical temperature of the obtained compound $Mg_XB_Y$ was 30 K. The measurement error on the obtained liquid level sensor device for liquefied gas was obtained likewise Example 13 to find that the error in measurement with the sensor device was 14% of the visually measured value.

Example 32

A binary compound containing magnesium and boron in the form of $Mg_XB_Y$ was prepared to give molar ratio X:Y of 1.4:2 by controlling the blending contents of magnesium chloride, sodium chloride, potassium chloride and magnesium borate at the time of producing a liquid level sensor device for liquefied gas by the electroplating method. Thereby likewise Example 1, a liquid level sensor device for liquefied gas was produced. The superconductive critical temperature of the obtained compound $Mg_XB_Y$ was 26 K. The measurement error on the obtained liquid level sensor device for liquefied gas was obtained likewise Example 13 to find that the error in measurement with the sensor device was 10% of the visually measured value.

Example 33

A binary compound containing magnesium and boron in the form of $Mg_XB_Y$ was prepared to give molar ratio X:Y of 1.6:2 by controlling the blending contents of magnesium chloride, sodium chloride, potassium chloride and magnesium borate at the time of producing a liquid level sensor device for liquefied gas by the electroplating method. Thereby likewise Example 1, a liquid level sensor device for liquefied gas was produced. The superconductive critical temperature of the obtained compound $Mg_XB_Y$ was 24 K. The measurement error on the obtained liquid level sensor device for liquefied gas was obtained likewise Example 13 to find that the error in measurement with the sensor device was 10% of the visually measured value.

Example 34

A binary compound containing magnesium and boron in the form of $Mg_XB_Y$ was prepared to give molar ratio X:Y of 1.8:2 by controlling the blending contents of magnesium chloride, sodium chloride, potassium chloride and magnesium borate at the time of producing a liquid level sensor device for liquefied gas by the electroplating method. Thereby likewise Example 1, a liquid level sensor device for liquefied gas was produced. The superconductive critical temperature of the obtained compound $Mg_XB_Y$ was 22 K. The measurement error on the obtained liquid level sensor device for liquefied gas was obtained likewise Example 13 to find that the error in measurement with the sensor device was 8% of the visually measured value.

Comparative Example 3

A binary compound containing magnesium and boron in the form of $Mg_XB_Y$ was prepared to give molar ratio X:Y of 1:0.8 by controlling the blending contents of magnesium chloride, sodium chloride, potassium chloride and magnesium borate at the time of producing a liquid level sensor device for liquefied gas by the electroplating method. Thereby likewise Example 1, a liquid level sensor device for liquefied gas was produced. The superconductive critical temperature of the obtained compound $Mg_XB_Y$ was 19 K. Liquid level measurement was tried with the obtained liquid level sensor device for liquefied gas. However, the critical

Comparative Example 4

A binary compound containing magnesium and boron in the form of $Mg_XB_Y$ was prepared to give molar ratio X:Y of 1:1.0 by controlling the blending contents of magnesium chloride, sodium chloride, potassium chloride and magnesium borate at the time of producing a liquid level sensor device for liquefied gas by the electroplating method. Thereby likewise Example 1, a liquid level sensor device for liquefied gas was produced. The superconductive critical temperature of the obtained compound $Mg_XB_Y$ was 20 K. Liquid level measurement was tried with the obtained liquid level sensor device for liquefied gas. However, the critical temperature was too low to give rise to superconductive transition under the measurement environment, and thus the liquid level measurement was impossible.

Comparative Example 5

A binary compound containing magnesium and boron in the form of $Mg_XB_Y$ was prepared to give molar ratio X:Y of 1:2.9 by controlling the blending contents of magnesium chloride, sodium chloride, potassium chloride and magnesium borate at the time of producing a liquid level sensor device for liquefied gas by the electroplating method. Thereby likewise Example 1, a liquid level sensor device for liquefied gas was produced. The superconductive critical temperature of the obtained compound $Mg_XB_Y$ was 19 K. Liquid level measurement was tried with the obtained liquid level sensor device for liquefied gas. However, the critical temperature was too low to give rise to superconductive transition under the measurement environment, and thus the liquid level measurement was impossible.

Comparative Example 6

A binary compound containing magnesium and boron in the form of $Mg_XB_Y$ was prepared to give molar ratio X:Y of 0.3:2 by controlling the blending contents of magnesium chloride, sodium chloride, potassium chloride and magnesium borate at the time of producing a liquid level sensor device for liquefied gas by the electroplating method. Thereby likewise Example 1, a liquid level sensor device for liquefied gas was produced. The superconductive critical temperature of the obtained compound $Mg_XB_Y$ was 19 K. Liquid level measurement was tried with the obtained liquid level sensor device for liquefied gas. However, the critical temperature was too low to give rise to superconductive transition under the measurement environment, and thus the liquid level measurement was impossible.

Comparative Example 7

A binary compound containing magnesium and boron in the form of $Mg_XB_Y$ was prepared to give molar ratio X:Y of 1.9:2 by controlling the blending contents of magnesium chloride, sodium chloride, potassium chloride and magnesium borate at the time of producing a liquid level sensor device for liquefied gas by the electroplating method. Thereby likewise Example 1, a liquid level sensor device for liquefied gas was produced. The superconductive critical temperature of the obtained compound $Mg_XB_Y$ was 20 K. Liquid level measurement was tried with the obtained liquid level sensor device for liquefied gas. However, the critical temperature was too low to give rise to superconductive transition under the measurement environment, and thus the liquid level measurement was impossible.

Comparative Example 8

A binary compound containing magnesium and boron in the form of $Mg_XB_Y$ was prepared to give molar ratio X:Y of 2.0:2 by controlling the blending contents of magnesium chloride, sodium chloride, potassium chloride and magnesium borate at the time of producing a liquid level sensor device for liquefied gas by the electroplating method. Thereby likewise Example 1, a liquid level sensor device for liquefied gas was produced. The superconductive critical temperature of the obtained compound $Mg_XB_Y$ was 15 K. Liquid level measurement was tried with the obtained liquid level sensor device for liquefied gas. However, the critical temperature was too low to give rise to superconductive transition under the measurement environment, and thus the liquid level measurement was impossible.

The results of Examples 20 to 27 and Comparative Examples 3 to 5 were compiled in Table 5 and the results of Examples 28 to 34 and Comparative Examples 6 to 8 were compiled in Table 6 respectively. It has been found that further highly accurate liquid level measurement becomes feasible with allowable range of measurement error on the liquid level being not more than 15% of visually measured value and consequently with $MgB_2$ superconductive compound $Mg_XB_Y$ disposed on the surface of the metal core to give molar ratio X:Y of X=1 and Y=1.2 to 1.9 or 2.1 to 2.8
Y=2 and X=0.4 to 0.9 or 1.1 to 1.8.

[Table 5]

TABLE 5

|  |  | EXAMPLE 20 | EXAMPLE 21 | EXAMPLE 22 | EXAMPLE 23 | EXAMPLE 24 | EXAMPLE 25 |
|---|---|---|---|---|---|---|---|
| Mg—B COMPOUND ARRANGED ON SURFACE OF METAL CORE | COMPOSITION (Mg:B) | 1:1.2 | 1:1.5 | 1:1.7 | 1:1.9 | 1:2.0 | 1:2.1 |
| PROPERTY OF LIQUEFIED GAS LIQUID LEVEL SENSOR | CRITICAL TEMPERATURE | 21 | 25 | 28 | 30 | 38 | 31 |
|  | LIQUEFIED GAS LIQUID LEVEL MEASUREMENT | FEASIBLE | FEASIBLE | FEASIBLE | FEASIBLE | FEASIBLE | FEASIBLE |
|  | LIQUID LEVEL MEASUREMENT ERROR | 8 | 10 | 11 | 14 | 30 | 12 |

TABLE 5-continued

|  |  | EXAMPLE 26 | EXAMPLE 27 | COMPARATIVE EXAMPLE 3 | COMPARATIVE EXAMPLE 4 | COMPARATIVE EXAMPLE 5 |
|---|---|---|---|---|---|---|
| Mg—B COMPOUND ARRANGED ON SURFACE OF METAL CORE | COMPOSITION (Mg:B) | 1:2.5 | 1:2.8 | 1:0.8 | 1:1.0 | 1:2.9 |
| PROPERTY OF LIQUEFIED GAS LIQUID LEVEL SENSOR | CRITICAL TEMPERATURE | 26 | 21 | 19 | 20 | 19 |
|  | LIQUEFIED GAS LIQUID LEVEL MEASUREMENT | FEASIBLE | FEASIBLE | MEASUREMENT UNFEASIBLE | MEASUREMENT UNFEASIBLE | MEASUREMENT UNFEASIBLE |
|  | LIQUID LEVEL MEASUREMENT ERROR | 11 | 7 | — | — | — |

TABLE 6

|  |  | EXAMPLE 28 | EXAMPLE 29 | EXAMPLE 30 | EXAMPLE 31 | EXAMPLE 32 | EXAMPLE 33 |
|---|---|---|---|---|---|---|---|
| Mg—B COMPOUND ARRANGED ON SURFACE OF METAL CORE | COMPOSITION (Mg:B) | 0.4:2 | 0.7:2 | 0.9:2 | 1.1:2 | 1.4:2 | 1.6:2 |
| PROPERTY OF LIQUEFIED GAS LIQUID LEVEL SENSOR | CRITICAL TEMPERATURE | 21 | 27 | 31 | 30 | 26 | 24 |
|  | LIQUEFIED GAS LIQUID LEVEL MEASUREMENT | FEASIBLE | FEASIBLE | FEASIBLE | FEASIBLE | FEASIBLE | FEASIBLE |
|  | LIQUID LEVEL MEASUREMENT ERROR | 5 | 10 | 12 | 14 | 10 | 10 |

|  |  | EXAMPLE 34 | COMPARATIVE EXAMPLE 6 | COMPARATIVE EXAMPLE 7 | COMPARATIVE EXAMPLE 8 |
|---|---|---|---|---|---|
| Mg—B COMPOUND ARRANGED ON SURFACE OF METAL CORE | COMPOSITION (Mg:B) | 1.8:2 | 0.3:2 | 1.9:2 | 2.0:2 |
| PROPERTY OF LIQUEFIED GAS LIQUID LEVEL SENSOR | CRITICAL TEMPERATURE | 22 | 19 | 20 | 15 |
|  | LIQUEFIED GAS LIQUID LEVEL MEASUREMENT | FEASIBLE | MEASUREMENT UNFEASIBLE | MEASUREMENT UNFEASIBLE | MEASUREMENT UNFEASIBLE |
|  | LIQUID LEVEL MEASUREMENT ERROR | 8 | — | — | — |

Example 35

Except that an INCONEL® superalloy wire with a wire diameter of 0.08 mm was used as a metal core to adjust film thickness of the MgB$_2$ superconductive layer (MgB$_2$) to be 0.05 m, the electroplating method likewise Example 1 was adopted to produce the liquid level sensor device for liquefied gas. The liquefied gas liquid level sensor device was inserted into liquefied epoxy-type resin (Stycast 2850FT produced by JECC TORISHA Co., Ltd.) to undergo impregnation process in a vacuum. And the impregnation-reinforced sensor device was connected to a current lead and a voltage lead. Here, intentionally applying 1 kg-weight tension to the lead connected to the impregnated sensor device was, the sensor device underwent operation confirmation. 10 samples of the impregnated sensor device were produced and confirmed operation. As a consequence, disconnection or deterioration in performance did not take place in the impregnation reinforced sensor device.

Example 36

A liquid level sensor device for liquefied gas produced likewise example 35 underwent assessment likewise example 35 without being inserted into resin. As a consequence, disconnection took place in 2 samples and deterioration in performance took place in 6 samples.

Example 37

A liquid level sensor device for liquefied gas produced likewise example 35 was checked on response speed due to the lapse of time. As a consequence, it has been found that deterioration in performance does not take place even after two years lapsed in the case of insertion into resin.

Example 38

A liquid level sensor device for liquefied gas produced likewise example 35 underwent assessment likewise example 37 without being inserted into resin. As a consequence, it has been found that response speed decreases by 2% in 30 days, by 3% in 90 days 0 and by 5% in a year after production.

As a result of Examples 35 to 38, impregnation and reinforcement of a sensor device was turned out to be an effective means for preventing deterioration in performance caused by heat stress or distortion and deterioration in performance due to the lapse of time.

Example 39

Figure 7:
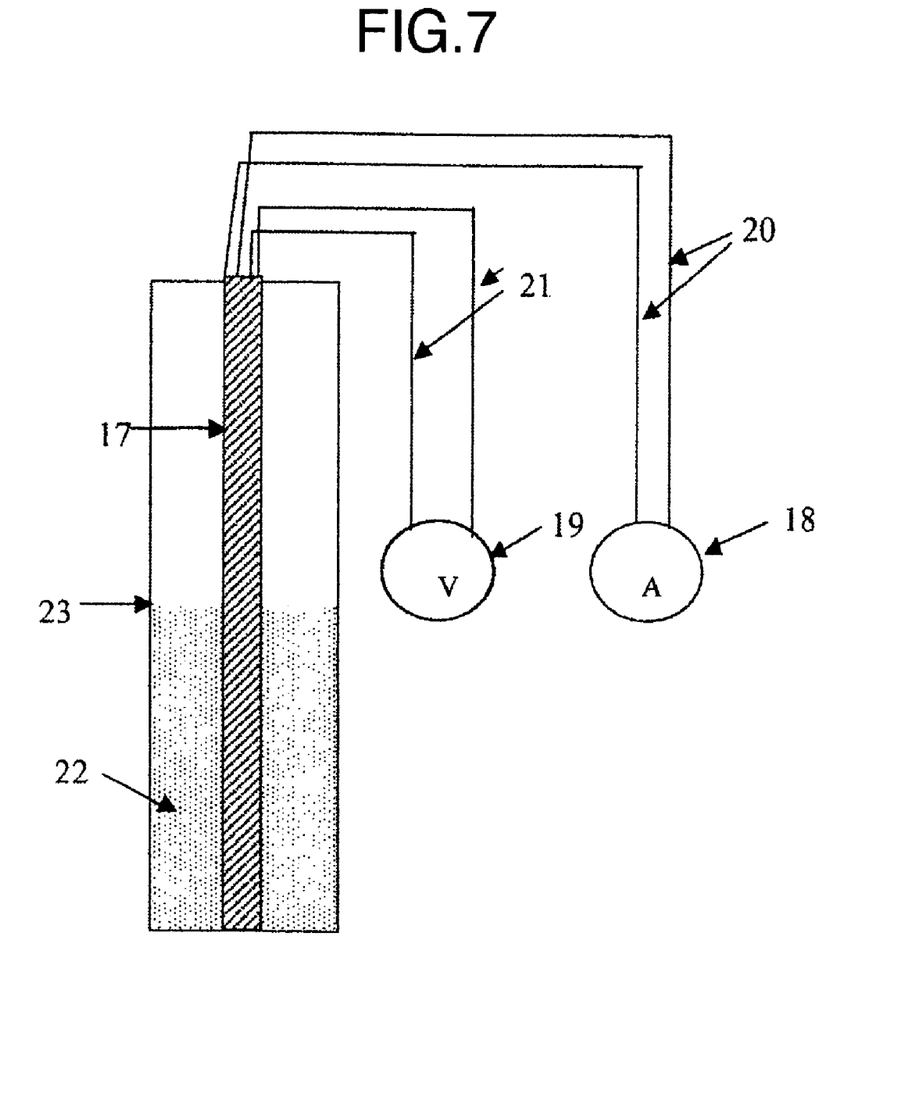
FIG. 7 is a schematic diagram of a liquid level measuring system in utilization of a liquid level sensor device for liquefied gas of Example 39.
Figure 8:
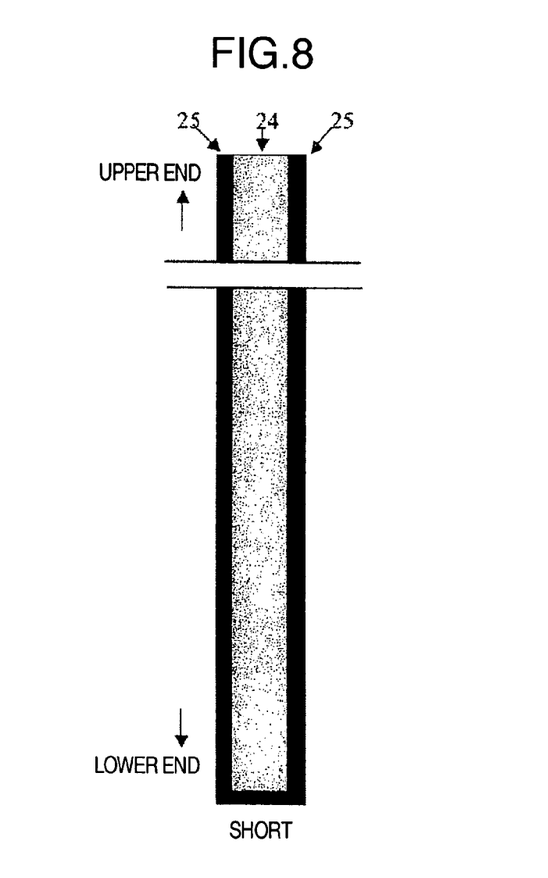
FIG. 8 is a sectional side elevation of a liquid level sensor device for liquefied gas of Example 39.

FIG. 7 illustrates a liquefied gas liquid level measuring system with a coaxial liquid level sensor device for liquefied gas in the present example. In the present example, the lower end of the liquid level sensor device for liquefied gas is brought into short and is a liquid level sensor device for liquefied gas in cylindrical single-layer structure as illustrated in FIG. 8. A multilayer-structured sensor device was inserted perpendicular to the liquid level of the liquefied gas 22 in the container. The direct current source 18 supplied appropriate current. The liquid level 23 was measured from the electric resistance thereof. The basic property was not different from that of the sensor device structured as illustrated in FIG. 1. However, current lead 20 and voltage lead 21 were no longer pulled from the lower end of the sensor device to simplify wiring. In addition, the probability of disconnection on pulling from the lower end to the upper end of the sensor device decreased dramatically.

A normal sensor device was in the state incorporated in a metal pipe. When the measurement line from the lower end of the sensor device came into contact with the sensor device wire, thermal failure took place, giving rise to such a problem that response speed drops or the position of the liquid level cannot be measured and the like. In contrast, application of cross-sectional structure of the present example and simplification of pulling of the measurement line of electric resistivity improved response speed by 10% to 40%. In addition, measurement accuracy on the liquid level was improved by 8% to 25%.

Example 40

Figure 9:
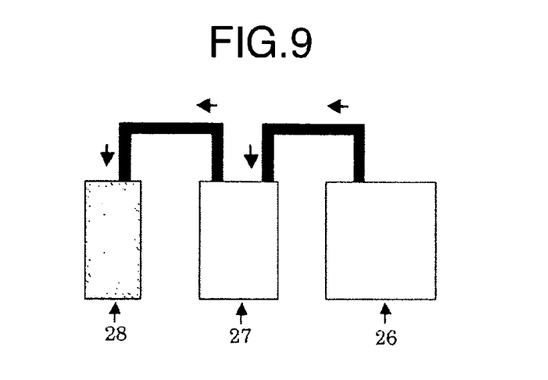
FIG. 9 is a schematic diagram of a system for supplying hydrogen to a fuel-cell installed vehicle.

A liquid level sensor device for liquefied gas of the present invention for application was introduced to the hydrogen lead line and the hydrogen supply line of a hydrogen station which supplied hydrogen to a fuel-cell installed vehicle. FIG. 9 is a conceptual diagram of a hydrogen lead line, a hydrogen supply line and a hydrogen station for supply to a fuel-cell installed vehicle in the present invention. Actually, a device for obtaining required properties is provided. Specific structure for that purpose is provided.

Supply of hydrogen from the hydrogen supply source 26 to a vehicle is configured by a lead line for leading hydrogen to a fixed or mobile hydrogen station 27 and a supply line for supplying the fuel-cell installed vehicle 28 with hydrogen from the hydrogen station 27. A storage tank and the pipes for the lead line and the supply line are desired to be hydrogen absorbing alloy. In addition, it is also preferable to provide electromagnetic valve at a spot or a plurality of spots of the lines.

In order to measure such liquid level of liquefied hydrogen in the liquefied hydrogen lead line as well as supply line, a liquid level sensor device for liquefied gas in the multilayer structure having a configuration produced likewise Example 39 was installed and the related quantities were monitored and controlled. In addition, the liquid level sensor device for liquefied gas was also installed in the fuel-cell installed vehicle 28.

Thereby, compared with conventional mechanical, optical and electrical methods, response speed was improved by not less than 80% and measurement accuracy on the liquid level was improved by not less than 55%.

Examples are described with liquefied hydrogen as a refrigerant as an example so far. However, it is apparent that use of liquid helium, liquid neon, liquid nitrogen, liquid oxygen, liquid air or liquid inactive gas and the like and superconductor having a critical temperature close to the boiling point of those refrigerants as a liquid level sensor device for liquefied gas enables production of superconductive liquid level sensor device for liquefied gas having a likewise configuration.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A liquid level sensor device for liquefied hydrogen comprising a superconductive compound layer arranged in succession in the longitudinal direction over the entire or a part of surface of a linear conductor made of metal, wherein the superconductive compound layer contains a binary compound of magnesium and boron where Mg:B=X:Y has a molar ratio of Mg and B falling within a range of X=1 and Y=1.2 to 1.7 or 2.5 to 2.8 or within a range of Y=2 and X=0.4 to 0.7 or 1.4 to 1.8, has a superconducting transition temperature of 21 to less than 30° K, and is configured such that a portion of the compound of magnesium and boron dipped in liquid hydrogen is in a superconductive state at the time of measuring a liquid hydrogen level.

2. The liquid level sensor device for liquefied hydrogen according to claim 1, wherein the diameter of a cylinder falls within a range of 0.04 mm to 0.2 mm in the case where the shape of the liquid level sensor device for liquefied hydrogen is the cylinder.

3. The liquid level sensor device for liquefied hydrogen according to claim 1, wherein electric resistivity of the superconductive compound layer containing the binary compound of magnesium and boron arranged on the surface of a linear conductor in a normal conductive state falls within a range of 5 times to 100 times larger than electric resistivity of the linear conductor.

4. The liquid level sensor device for liquefied hydrogen according to claim 1, wherein when the liquid level sensor device for liquefied hydrogen has electric resistivity of $\rho$ (300 K) at the temperature of 300 K and electric resistivity of $\rho$ (40 K) at the temperature of 40 K, the value of $1-(\rho(40 K)/\rho(300 K))$ is not more than 0.5.

5. The liquid level sensor device for liquefied hydrogen according to claim 1, wherein the superconductive compound layer containing the binary compound of magnesium and boron contains at least one element selected from the group consisting of carbon and silicon.

6. The liquid level sensor device for liquefied hydrogen according to claim 1, wherein the surface of the liquid level sensor device for liquefied gas is coated with resin.

7. The liquid level sensor device for liquefied hydrogen according to claim 1, wherein metal and a plurality of superconductive compound layers containing a binary compound of magnesium and boron are stacked coaxially to form multilayered structure and the superconductive compound layers are mutually shorted at one end thereof.

8. A liquid level sensor for liquefied hydrogen, comprising a sensor device according to any of claims 1 and 2 to 7.

9. The liquid level sensor for liquefied hydrogen according to claim 8 wherein the liquid level sensor for liquefied hydrogen is operated in a hydrogen station for supplying a fuel-cell installed vehicle with hydrogen and determines quantity of liquid hydrogen flow inside the lines, comprising a sensor device which has a lead line for leading hydrogen from a hydrogen lead source to a hydrogen station and a supply line for supplying hydrogen from the hydrogen station to a fuel-cell installed vehicle.

10. A method of manufacturing the liquid level sensor device for liquefied hydrogen according to any of claims 1 and 2 to 7, wherein the compound superconductive layer containing the binary compound of magnesium and boron is arranged on the entire or a part of the surface of the linear conductor made of metal by an electroplating method.

11. The method according to claim 10, wherein the superconductive compound layer containing the binary compound of magnesium and boron is heat treated during the electroplating method, and a heat treating temperature, heat treating time or heat treating atmosphere is adjusted to provide the superconductive compound layer with the superconducting transition temperature of 21 to less than 30° K.

12. The liquid level sensor device for liquefied hydrogen according to claim 1, wherein the superconductive compound layer is made by an electroplating method and is heat treated during the electroplating method, wherein a heat treating temperature, heat treating time or heat treating atmosphere is adjusted to provide the superconductive compound layer with the superconducting transition temperature of 21 to less than 30° K.

13. A liquid level measuring system comprising the liquid level sensor device for liquefied hydrogen according to claim 1, a direct current source connected to an upper end of the liquid level sensor device via a current lead, and a voltmeter connected to an upper end of the liquid level sensor device via a voltage lead.

* * * * *